United States Patent [19]

Shibata

[11] 4,085,586
[45] Apr. 25, 1978

[54] SECONDARY AIR SUPPLY SYSTEM FOR INTERNAL COMBUSTION ENGINES

[75] Inventor: Norio Shibata, Susono, Japan

[73] Assignee: Toyota Jidosha Kogyo Kabushiki Kaisha, Toyota, Japan

[21] Appl. No.: 693,125

[22] Filed: Jun. 4, 1976

[30] Foreign Application Priority Data

Feb. 26, 1976 Japan .................................. 51-20499

[51] Int. Cl.² .............................................. F01N 3/10
[52] U.S. Cl. ......................................... 60/277; 60/293; 60/307; 417/380
[58] Field of Search ......................... 60/293, 277, 307; 417/380

[56] References Cited

U.S. PATENT DOCUMENTS

| | | | |
|---|---|---|---|
| 3,106,821 | 10/1963 | Ridgway | 60/293 |
| 3,263,701 | 8/1966 | Johnson | 417/380 X |
| 3,314,230 | 4/1967 | Vanderpoel | 60/293 |
| 3,417,562 | 12/1968 | Morris | 60/307 |
| 3,498,054 | 3/1970 | Theed | 60/290 |
| 3,877,222 | 4/1975 | Scherenberg | 60/307 |
| 3,983,697 | 10/1976 | Goto et al. | 60/277 |

Primary Examiner—Carlton R. Croyle
Assistant Examiner—Michael Koczo, Jr.
Attorney, Agent, or Firm—Birch, Stewart, Kolasch & Birch

[57] ABSTRACT

A system for supplying secondary air into the exhaust system of internal combustion engines having in combination two parallel systems, one feeding air depending upon exhaust gas pressure pulsation and the other feeding air depending upon intake vacuum pulsation.

4 Claims, 4 Drawing Figures

SECONDARY AIR SUPPLY SYSTEM FOR INTERNAL COMBUSTION ENGINES

BACKGROUND OF THE INVENTION

1. Field of the Invention:

The present invention relates to a secondary air supply system for supplying secondary air into the exhaust system of internal combustion engines for the purpose of purifying exhaust gases.

2. Description of the Prior Art:

It is known to employ a secondary air supply system as a counter measure for purifying exhaust gases from internal combustion engines so that harmful uncombusted components such as HC and CO contained in the exhaust gases are further combusted in the exhaust system under a supply of secondary air. A secondary air supply system such as this generally comprises a rotary air pump such as a vane pump additionally mounted to a conventional internal combustion engine to inject compressed air into the exhaust system of the engine by way of an air injection manifold. As an alternative, it has also been proposed to utilize exhaust gas pulsation in the exhaust system for injecting secondary air into the exhaust system by employing a system comprising a passage means connected at one end thereof to the exhaust pipe and opened at the other end thereof to the atmosphere and a check valve provided in the midst of said passage means, said check valve being adapted to allow air to flow only toward the exhaust pipe so as to effect pumping action to feed air into the exhaust pipe. The system employing the air pump has an advantage that it is capable of supplying any required quantity of secondary air into the exhaust system if a pump of a suitable capacity is employed the system employing the check valve to utilize exhaust gas pulsation to produce a pumping action has an advantage that a secondary air supply system is obtained by a simple structure such that a check valve is provided in the midst of a secondary air supply passage. Obviously, therefore, the latter system depending upon the exhaust gas pulsation is cheaper than the system employing an air pump. However, the latter system has a limitation with respect to the capacity thereof and is unable to supply a large amount of air sufficient to accomplish the required purification of exhaust gases, particularly when used with a large piston displacement.

On the other hand, it is favorable that the amount of secondary air injected into the exhaust system is maintained at a constant ratio with respect to the amount of engine intake air. This, of course, means that if the rotational speed of the engine increases, a larger amount of secondary air is to be supplied into the exhaust system. However, when the supply of secondary air depends upon the exhaust gas pulsation, the amount of secondary air actually injected into the exhaust system decreases as the rotational speed of the engine increases because the amplitude of the exhaust gas pulsation decreases in accordance with an increase in the rotational speed of the engine. Consequently, the performance of secondary air supply in this system is contrary to the actual requirement for secondary air.

Now, in internal combustion engines there also exists another pulsating phenomenon in the air flow in the intake system thereof and this intake air flow pulsation has a characteristic that the amplitude of the pulsation increases in accordance with decrease of the intake vacuum by contrast to the characteristic of the exhaust gas purification.

SUMMARY OF THE INVENTION

Therefore, it is the object of the present invention to provide an improved secondary air supply system having a favorable performance in view of the proportion of secondary air to the engine intake air by combining pumping actions due to the exhaust gas pulsation and intake air pulsation.

According to the present invention, the abovementioned object is accomplished by a secondary air supply system for internal combustion engines comprising a first supply system which includes a passage means for conducting air into the exhaust system of the engine and a check valve provided in the midst of said passage means for allowing air to flow only toward the exhaust system so that air is introduced into the exhaust system by utilizing exhaust gas pressure pulsation in the exhaust system and a second supply system which includes an air pump driven by the pulsating intake vacuum to pump air into the exhaust system.

In a secondary air supply system of the abovementioned constitution, the quantity of secondary air supplied into the exhaust system is the sum of the air supplied by the pumping actions due to the exhaust gas pulsation and intake air pulsation. Thus a sufficiently large capacity of the secondary air supply system is available for the exhaust system and the performance thereof with regard to the quantity of air supply in relation to the engine intake air can be favorably adjusted by properly compensating the pumping effects by the exhaust gas pulsation and intake air pulsation with each other. Furthermore, when the system for injecting secondary air by utilizing intake air pulsation is incorporated in the secondary air supply system, the amount of secondary air supply is instantly increased during acceleration of the engine, whereby high density of HC and CO in exhaust gases during acceleration of the engine can meet with a sufficient amount of secondary air supply.

According to an additional feature of the invention, the system may comprise a switch-over valve which selectively opens a vacuum conducting passage for said intake vacuum-operated air pump to the atmosphere in accordance with the temperature of a catalytic converter provided in the way of the exhaust gas passage so that the pump-driving intake vacuum is released to the atmosphere when the catalyst temperature has risen beyond a predetermined level. By the provision of the switch-over valve, the supply of secondary air by the intake vacuum operated air pump is stopped when the catalytic converter is in a overheated condition above a predetermined temperature, whereby the flow rate of secondary air is reduced to protect the catalytic converter from damage by overheating. Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
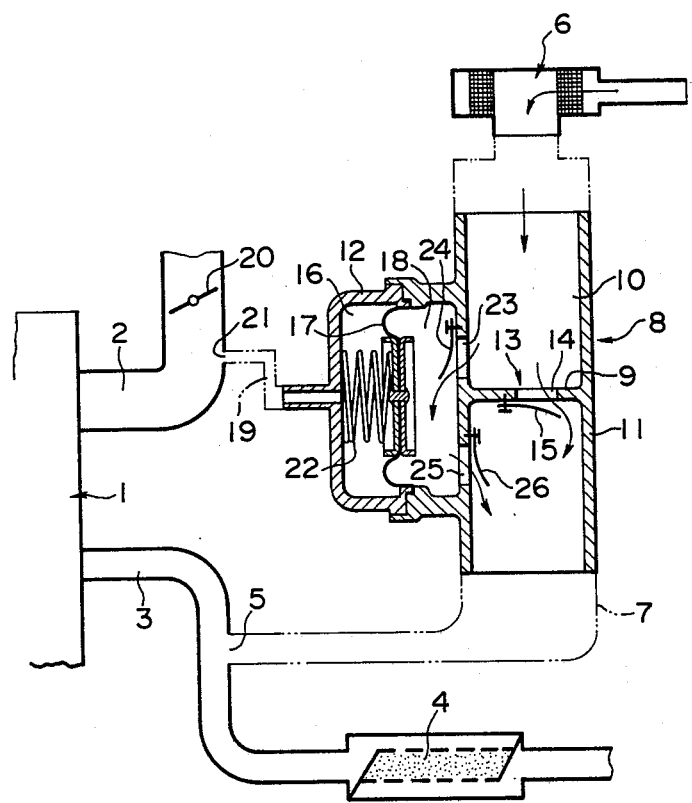
FIG. 1 is a schematic sectional view showing an embodiment of the secondary air supply system of the present invention incorporated in an associated internal combustion engine.

Turning now to FIG. 1, an internal combustion engine 1 schematically shown by a block has an intake tube or manifold 2 through which air or fuel-air mixture is fed and an exhaust tube or manifold 3 through which exhaust gases are discharged. A catalytic converter 4 of a conventional type is provided in the way of the exhaust tube. Into the exhaust tube upstream of the catalytic converter there opens a secondary air supply port 5 which is connected with one end of a secondary air supply tube 7 having an air cleaner 6 connected at the other end thereof. The secondary air supply tube 7 includes a check valve-pump assembly 8 therein.

The check valve — pump assembly 8 comprises a valve casing portion 11 forming a part of the secondary air supply tube 7, said casing portion including a partition 9 which divides the air passage defined by the casing portion into an upstream portion (air cleaner side portion) and a downstream portion (exhaust tube side portion). The assembly further comprises a pump casing portion 12 located on one side of the pump casing portion. The partition 9 of the pump casing portion carries a check valve structure including a through opening 14 formed in the partition and a reed valve element 15 mounted at the lower side of the partition, said reed valve element being biased toward a position where it closes the through opening 14 by its own elasticity.

The pump casing portion 12 defines therein an actuating chamber 16 and a pumping chamber 18, each being isolated from each other by a diaphragm 17. The actuating chamber 16 is connected through a conduit 19 with a port 21 opened toward the intake air passage defined by the intake tube or manifold 2 at a position downstream of the throttle valve 20 so that the chamber 16 is in communication with the intake vacuum of the engine. The diaphragm 17 is biased by a compression coil spring 22 rightward in the figure so that the leftward shift of the diaphragm due to the intake vacuum applied to the chamber 16 is opposed by the spring force of the spring 22. The pumping chamber 18 is connected with the upstream region of the air passage 10 above the partition 9 through an air inlet port 23 and is also connected with the downstream portion of the air passage 10 below the partition 9 through an air outlet port 25. The air inlet port 23 is associated with a reed valve element 24 which allows air to flow only from the air passage 10 to the pumping chamber 18. Similarly, the air outlet port 25 is associated with a reed valve element 26 which allows air to flow only from the pumping chamber 18 to the air passage 10.

In operation, pulsating flow produced in the exhaust tube 3 periodically causes a vacuum in the exhaust tube which is applied to the check valve structure 13 thereby causing a flow of air which traverses the check valve structure from its upstream side to its downstream side while biasing the reed valve element 15 downward as shown in FIG. 1. This biasing of the reed valve element 15 supplies secondary air into the exhaust system through the route of air passage 10, check valve structure 13 and port 5.

Figure 2:
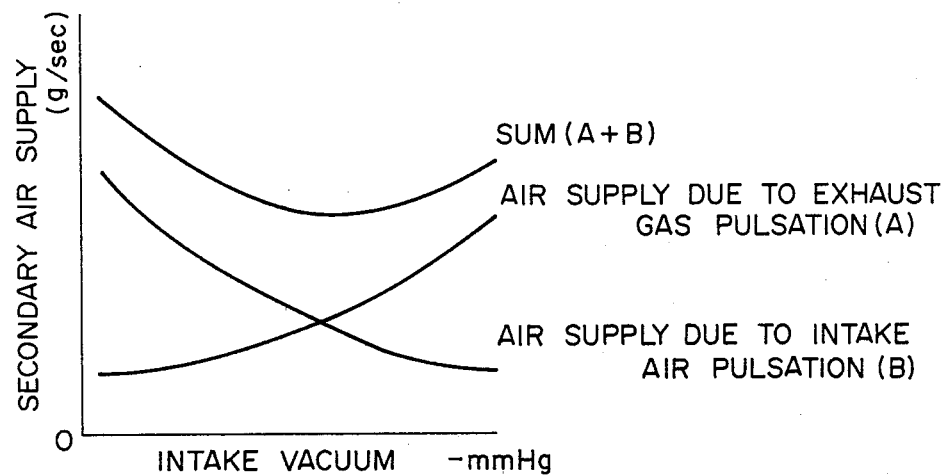
FIG. 2 is a graph showing the relation between the quantity of secondary air supply and engine intake vacuum effected by the secondary air supply system of the invention.

On the other hand, simultaneously, when the vacuum in the intake tube 2 is relatively great in fluctuations thereof, the diaphragm 17 is biased leftward as shown in FIG. 1 against the action of the compression coil spring 22 by the greater vacuum applied to the actuating chamber 16 through the conduit 19 with the result that air is taken into the pumping chamber 18 through the port 23 while biasing the reed valve element 24 leftward as shown in FIG. 1. In the next instant, when the vacuum in the intake tube 2 becomes relatively small in fluctuations thereof, the diaphragm 17 is biased rightward as shown in FIG. 1 by the action of the spring 22 while discharging a part of air contained in the pumping chamber 18 through the port 25 toward the air passage 10 while biasing the reed valve element 26 rightward as shown in FIG. 1. In this manner, in accordance with the fluctuations of vacuum in the intake tube, air is pumped through the air pump incorporated in the pump housing portion 12 toward the secondary air supply port 5. Consequently, the exhaust gases flowing through the exhaust tube 3 are supplied as the sum of secondary air injected due to the exhaust gas pulsation (A) and secondary air injected due to the intake air pulsation (B) as illustrated in FIG. 2. As apparent from the graph, the quantity of secondary air injection is increased when compared with the conventional system depending only upon the exhaust gas pulsation, particularly in the region where the intake vacuum is small or the engine is operating at high speed and load. Thus the present invention solves the problem that in the conventional system the supply of secondary air is insufficient in high load and speed conditions.

Figure 3:
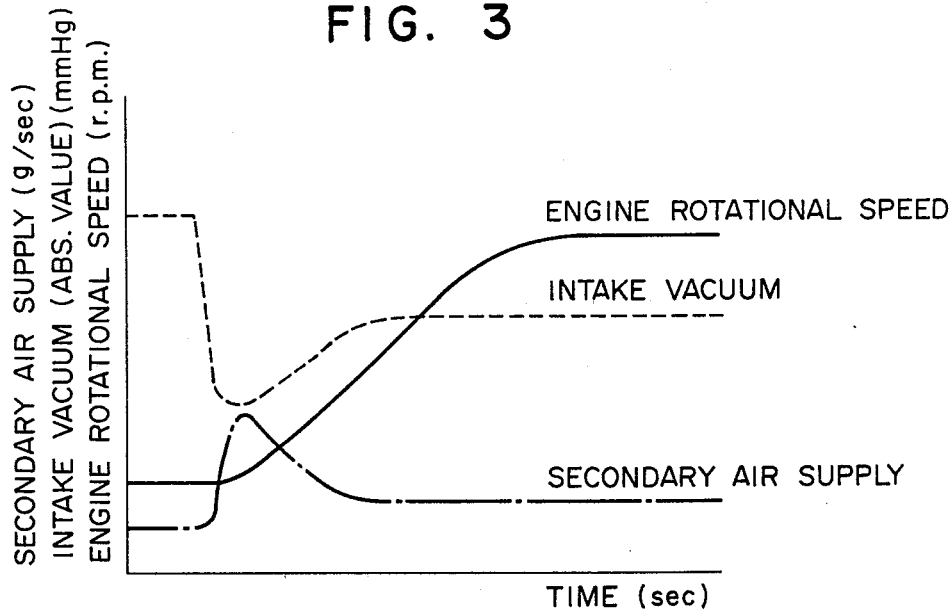
FIG. 3 is a graph showing the performance of secondary air supply during acceleration of the engine together with associated factors such as engine rotational speed and intake vacuum; and, FIG. 4 is a schematic sectional view of another embodiment of the secondary air supply system of the invention.

Furthermore, as shown in FIG. 3, since the intake vacuum considerably decreases during acceleration of the engine, the pumping action of the intake vacuum-operated air pump is enhanced thereby correspondingly increasing the quantity of air pumped thereby toward the exhaust system. This favorably meets with an increase of HC and CO in exhaust gases caused by a rich fuel-air mixture supplied to the engine during acceleration thereof, thus ensuring sufficient exhaust gas purification even under accelerating conditions of the engine.

Figure 4:
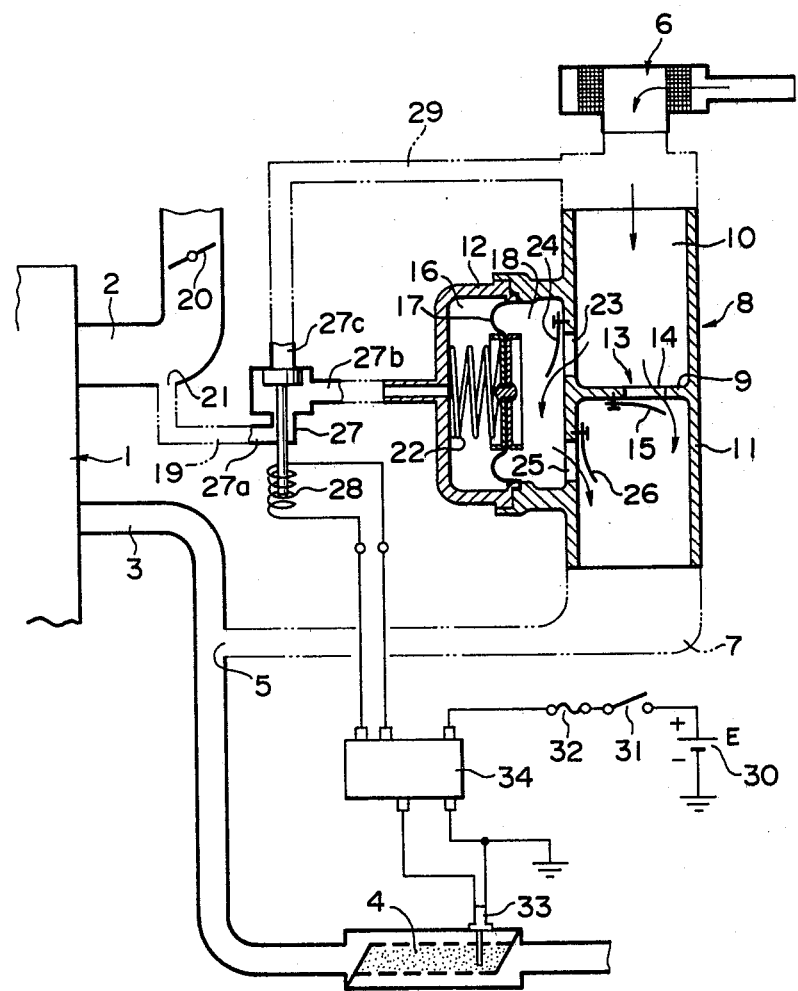

FIG. 4 shows another embodiment of the secondary air supply system of the invention. In FIG. 4, the portions corresponding to those shown in FIG. 1 are designated by the same reference numerals and a detailed explanation of these portions is omitted for the purpose of simplicity. In this embodiment, an electromagnetic switch-over valve 27 is provided in the conduit 19 for conducting intake vacuum to the actuating chamber 16. When not energized, the electromagnetic valve 27 is biased upward as shown in FIG. 4 to communicate a first port 27a connected with the intake vacuum sensing port 21 to a second port 27b connected to the actuating chamber 16. By contrast, when the solenoid 28 of the electromagnetic valve is energized, the valve is biased downward to communicate the second port 27b to a third port 27c instead of the first port 27a, said third port being connected to the outlet portion of the air cleaner 6 by way of a conduit 29 so that the actuating chamber 16 is substantially released to the atmosphere. The solenoid 28 of the electromagnetic valve 27 is selectively energized by a circuit including a battery 30, ignition switch 31 for the engine, fuse 32 and controller 34 which operates to close or open the circuit in accordance with the temperature of the catalytic converter 4 detected by a thermo-sensor 33. When the thermo-sensor 33 is detecting temperatures below a predetermined level, the controller 34 is biased to open the energizing circuit for the solenoid 28, thus communicating the port 27a and 27b so that the intake vacuum-operated air pump is actuated. By contrast, when the thermo-sensor 33 detects overheating of the catalytic converter 4, the controller 34 closes the circuit for the solenoid 28 to bias the valve element downward as shown in FIG. 4 thereby connecting ports 27b and 27c to release the actuating chamber 16 to the atmosphere to render the air pump inoperative. Consequently, when the catalytic converter 4 is maintained under a predetermined temperature, the quantity of secondary air fed into the exhaust system of the engine is the sum of those due to the exhaust gas pulsation and intake air pulsation, while the quantity of secondary air is reduced to that due to the exhaust gas pulsation when the catalytic converter has been overheated beyond a predetermined temperature to protect the converter from being thermally damaged.

Although in the above explained two embodiments the check valve structure 13 and the air pump structure 12 are assembled into a single casing means by employing a common air passage for the air delivered by the pumping action due to exhaust gas pulsation and for the air delivered by the diaphragm pump structure actuated by intake air pulsation, it will be understood that the present invention is not limited to this structure and that two systems may be separately provided so that finally the supply of secondary air is the sum of delivery due to the exhaust gas pulsation and intake air pulsation.

Although the invention has been shown and described with respect to some preferred embodiments thereof, it should be understood by those skilled in the art that various changes and omissions in the form and details thereof may be made therein without departing from the spirit and the scope of the invention, and all such modifications as would be obvious to one skilled in the art are intended to be included within the scope of the following claims.

I claim:

1. A secondary air supply system for an internal combustion engine having intake and exhaust manifolds comprising:
    an air passage means having an upstream end opened to the atmosphere and a downstream end connected to the exhaust manifold of the engine;
    first and second air pumping means incorporated in parallel in said air passage means;
    said first air pumping means being a check valve which allows air to flow through said air passage means only from the upstream end toward the downstream end thereof;
    said second air pumping means being a diaphragm pump comprising a casing member, a diaphragm mounted in said casing member and defining an actuating chamber and a pumping chamber in said casing member;
    a first check valve which connects said pumping chamber to said air passage means at the upstream side of said first air pumping means;
    a second check valve which connects said pumping chamber to said air passage means at the downstream side of said first air pumping means; and
    a conduit means which connects said actuating chamber directly to the intake manifold of the engine.

2. The system of claim 1, further comprising a switch-over valve in the conduit means which selectively isolates said pumping chamber from the intake vacuum of the intake manifold of the engine in accordance with the temperature of a catalytic converter incorporated in the exhaust system.

3. The system of claim 2, wherein said switch-over valve is an electro-magnetic valve, said system further comprising a thermo-sensor for detecting temperature of the catalytic converter and a controller which selectively opens or closes an energizing circuit for the electro-magnetic valve in accordance with the temperature detected by said thermal detector.

4. The system of claim 3, wherein said electro-magnetic valve is energized when the temperature of the catalytic converter is above a predetermined level to isolate said air pump from the intake vacuum of the engine.

* * * * *